US006851092B2

(12) United States Patent
Chang et al.

(10) Patent No.: US 6,851,092 B2
(45) Date of Patent: Feb. 1, 2005

(54) SYSTEM AND METHOD FOR ESTABLISHING VIEWER SHOPPING PREFERENCES BASED ON VIEWING AND LISTENING PREFERENCES

(75) Inventors: Matthew Chang, San Diego, CA (US); Greg Gudorf, San Diego, CA (US); Aaron Dew, San Diego, CA (US); Anthony Lionel Creed, San Diego, CA (US); Rolf Toft, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 504 days.

(21) Appl. No.: 10/003,714

(22) Filed: Oct. 29, 2001

(65) Prior Publication Data

US 2003/0110496 A1 Jun. 12, 2003

(51) Int. Cl.[7] .............................. G06F 3/00
(52) U.S. Cl. ..................... 715/748; 715/962
(58) Field of Search ................ 235/745, 747, 235/962, 168, 748, 789, 811, 826; 705/26, 27, 14

(56) References Cited

U.S. PATENT DOCUMENTS 5,764,221 A * 6/1998 Willard ................ 345/173
5,887,271 A * 3/1999 Powell ................. 705/14
5,890,135 A * 3/1999 Powell ................. 705/14
6,237,145 B1 * 5/2001 Narasimhan et al. ...... 725/23
6,505,773 B1 * 1/2003 Palmer et al. ........... 235/380

OTHER PUBLICATIONS

ATM gift its user with the coupon, that has the term of validity, in the Electronic Maney IC Card; Aug. 1, 2000; IBM technical Disclosure Bulletin, Issue No. 436, p. No. 1430.*
Compact Portable Smart Card Functional Attachments; Jan. 1, 1998; IBM technical Disclosure Bulletin, Issue No. 1 Volum No. 41, pp. 51–52.*

* cited by examiner

Primary Examiner—Raymond J. Bayerl
Assistant Examiner—Kieu D Vu
(74) Attorney, Agent, or Firm—John L. Rogitz

(57) ABSTRACT

A system and method for establishing recommended items for purchase or rental at a shopping kiosk, based on TV/DVD/CD etc. viewing profiles. A removable media such as a flash memory device can be inserted into an entertainment device receptacle, and the viewer's subsequent viewing (or listening) habits, including selected programming and related data such as TV program category, title, etc., recorded to establish a profile. The media can be removed and taken to the shopping kiosk, where it is inserted and used by the kiosk to present a list of recommended items for purchase or rental, based on the viewing habit profile of the viewer.

15 Claims, 2 Drawing Sheets

SYSTEM AND METHOD FOR ESTABLISHING VIEWER SHOPPING PREFERENCES BASED ON VIEWING AND LISTENING PREFERENCES

BACKGROUND OF THE INVENTION

1. Field of the Invention

The present invention relates generally to home entertainment systems.

2. Description of the Related Art

Televisions and computers have become ubiquitous, and since both usually entail a visual display, efforts have been made to integrate both functions into a single system. In this way, a consumer need not purchase and operate two separate systems, which can burden some consumers who, while familiar with operating a television and its remote control, might not be familiar with operating, e.g., an Internet computer.

To the extent that attempts have been made to combine television with interactive features, it has generally been with the focus of producing what might be thought of as a "lean forward" system. That is, hybrid TV/computers have typically been more oriented toward productivity, generally thought of as a computer system characteristic, and less toward entertainment ("lean back"), generally regarded as a television system characteristic. It is not just the dichotomy between productivity and entertainment that distinguishes a "lean forward" experience from a "lean back" experience, however. As contemplated herein, "lean forward" activities often are experienced by only a single person, while "lean back" activities are often group experiences. Moreover, "lean back" activities can extend to purchasing products that are advertised on TV, as opposed to, e.g., making products for sale. In any case, with the above-mentioned critical observation of the present invention in mind, it can readily be appreciated that the differences between a system designed for "lean forward" experiences and a system designed for "lean back" experiences can be both subtle and profound.

An example of a "lean forward" system is the system known as "WebTV", in which preselected Internet pages are loaded once into a television during manufacture and never subsequently updated, with the preselected pages being accessible through the television using a computer keyboard with its attendant complexity. To access the pages, the consumer must access a central site by means of the keyboard, and then be redirected to a desired Web page. In terms of currently expected speeds of Internet access, this consumes an undue amount of time. Furthermore, it requires browser or browser-like operations that must be executed by a consumer. All of these features—use of a keyboard, knowledgeable use of a browser, and wait time for Web page access—are not per se unacceptable for a lean forward experience, but would severely detract from a lean back experience.

For instance, in the context of lean back, entertainment- and group-oriented experiences, consumers are accustomed to using a much simpler input device than a computer keyboard, namely, a remote control. Moreover, a user interface that is simpler than a Web browser, e.g., an electronic program guide (EPG), is preferred. Also, waiting for entertainment to load or otherwise be prepared for playing is distracting in a lean-back, group-oriented experience. But as exemplified above by the WebTV system, current systems that attempt to integrate television and computers essentially do so by grafting a TV onto what is essentially an underlying, lean forward computer system, and consequently provide less than optimum lean back experiences. As an example, it might be desirable to tailor TV settings to a viewer's personal profile without requiring the viewer to laboriously enter profile data, which otherwise would be characteristic of a lean forward experience. It might further be desirable to use the viewer's personal TV preferences profile to aid the viewer in subsequent shopping for products advertised on TV. One or more non-limiting objects of the present invention are to provide a system that accommodates lean back experiences better than existing systems by collecting data in the background on a viewer in a non-intrusive way to assist a viewer in finding items that match the viewer's taste, potentially on a recommended-if-you-like basis, as well as to assist advertisers to appropriately target products to consumers.

SUMMARY OF THE INVENTION

The invention provides a way for a viewer's preferences, i.e., viewing profile, to be used to help the viewer quickly find items for purchase that the viewer is likely to desire.

A method for enhancing a TV, DVD, or CD viewer's shopping experience includes engaging a removable memory device with a receptacle in communication with a TV. Information related to TV/DVD/CD content is stored on the memory device. The memory device can then be removed from the TV/DVD/CD and engaged with a receptacle that is in communication with a shopping kiosk. Based on the information stored on the memory device, a display, such as a recommended product list, can be presented to a viewer of the kiosk.

In another aspect, a method for enhancing shopping includes establishing communication between a memory device and an audio or video device such as a TV, and recording viewer selections of channels on the memory device. The method then envisions establishing communication between the memory device and at least one shopping computer. Based at least in part on the viewer selections of channels, product information is presented to a viewer. Recommended products can be matched with viewer preferences based on the viewer selections of channels.

In a preferred embodiment, the memory device is a portable device. Preferably, the acts of establishing communication include inserting the memory device into the TV and shopping computer, respectively. The shopping computer can be a kiosk.

In another aspect, a system for promoting purchase of a product includes a TV receiving at least one channel signal and a memory device removably engageable with the TV for recording the channel associated with the channel signal. The system also includes a shopping computer distanced from the TV and engageable with the memory device to receive information therefrom to present product information to a viewer.

In still another aspect, a smaller memory capacity removable media contains basic viewer profile information such as an identification or login. The media can be inserted into an entertainment device to store profile data and then removed therefrom, and data can be communicated via a network and accessed when the media is inserted into a networked kiosk. Additionally, to enhance a more shared experience the user may also access purchase recommendations based on a friend's profile.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

Figure 1:
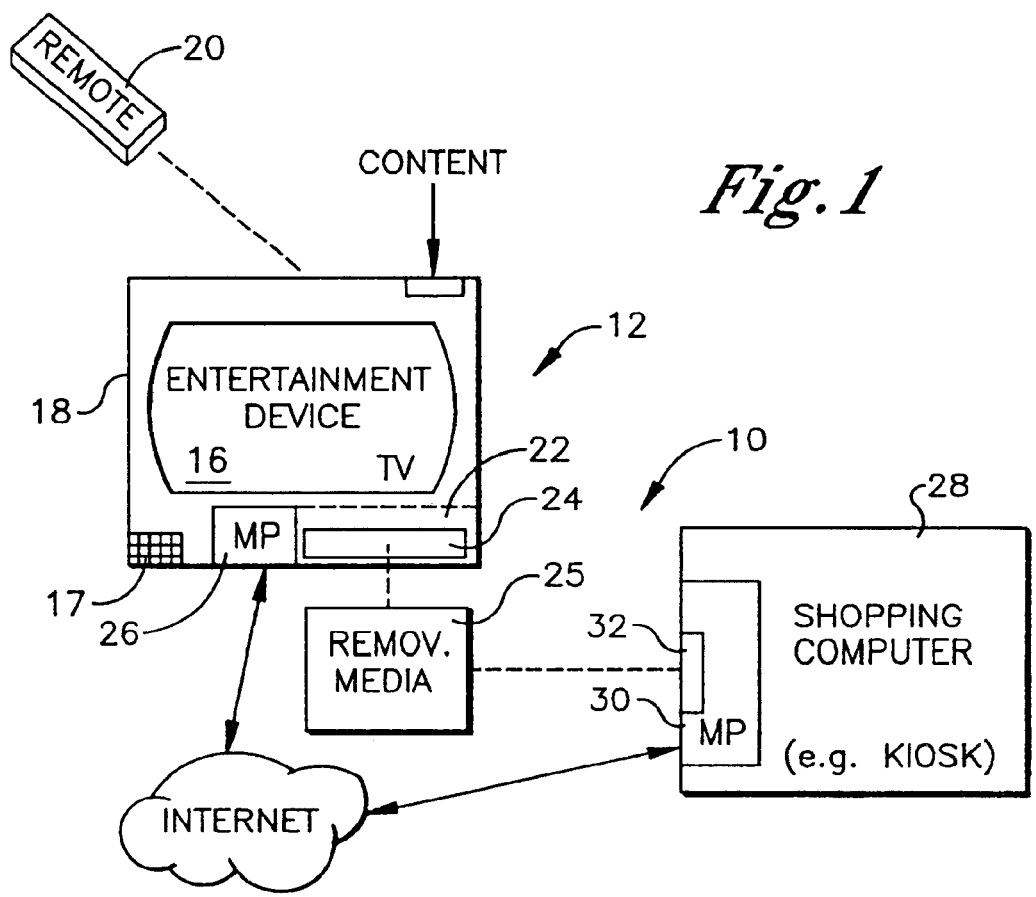
FIG. 1 is a block diagram of the system of the present invention.

Referring initially to FIG. 1, a system is shown, generally designated 10. As shown, the system 10 includes an entertainment audio or video device such as but not limited to a DVD, CD, PVR, VHS player, or a TV 12 that conventionally receives televised content at a content receiver 14 (e.g., an antenna, satellite dish, set-top box, etc.) for display of the content on a monitor 16 and associated speakers 17. The entertainment device can be connected to a wide area computer network such as the Internet if desired, as illustrated in FIG. 1.

While the embodiment below discusses a TV 12 with a single housing that is shown integrated with the microprocessor and media hub, it is to be understood that the term "television" encompasses any apparatus that has a television tuner and the below-described capability in a single housing or in separate housings that cooperate together. For instance, the term "TV" encompasses the television system shown in FIG. 1, as well as a conventional television in combination with a set-top box that functions in accordance with the present invention. In the latter example, the set-top box might include, e.g., the microprocessor and/or hub discussed below.

In the preferred non-limiting embodiment shown, the TV 12 includes a housing 18 that holds a conventional television tuner which receives the TV signals. One or more viewer input devices, such as but not limited to a wireless TV remote control device 20, can be used to input TV control signals in accordance with TV remote control principles known in the art.

A removable media hub 22 is incorporated into or otherwise associated with the TV 12. Specifically, as indicated above, the hub 22 can be incorporated into the housing 18 of the TV 12, or it can be separate therefrom. In any case, the media hub 22 includes one or more media receptacles 24, each one of which can removable receive a respective removable media device 25. The device 25 contains viewer profiles; that is, each device 25 is personalized to a respective person. In one non-limiting embodiment, the removable media devices 25 can be flash memory devices such as the Memory Stick® product made by the present assignee.

A microprocessor 26 can be associated with the TV 12. As intimated above, the microprocessor 26 can be located in the housing 18 or it can be disposed elsewhere, such as in a set-top box, remote control device, or other component such as a separate hub 22.

As shown in FIG. 1, a shopping kiosk 28 having a processor 30 and at least one media receptacle 32 is also included in the system 10. The receptacle 32 is configured for removably engaging the media device 25. When the device 25 is engaged with the receptacle 32, it communicates with the processor 30 within the kiosk 28. It is to be understood that the shopping kiosk 28 can be a shopping computer located at, e.g., a shopping mall or rental video store.

It is to be understood that the microprocessors 26, 30 execute some or all of the logic below. The flow charts herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device.

Figure 2:
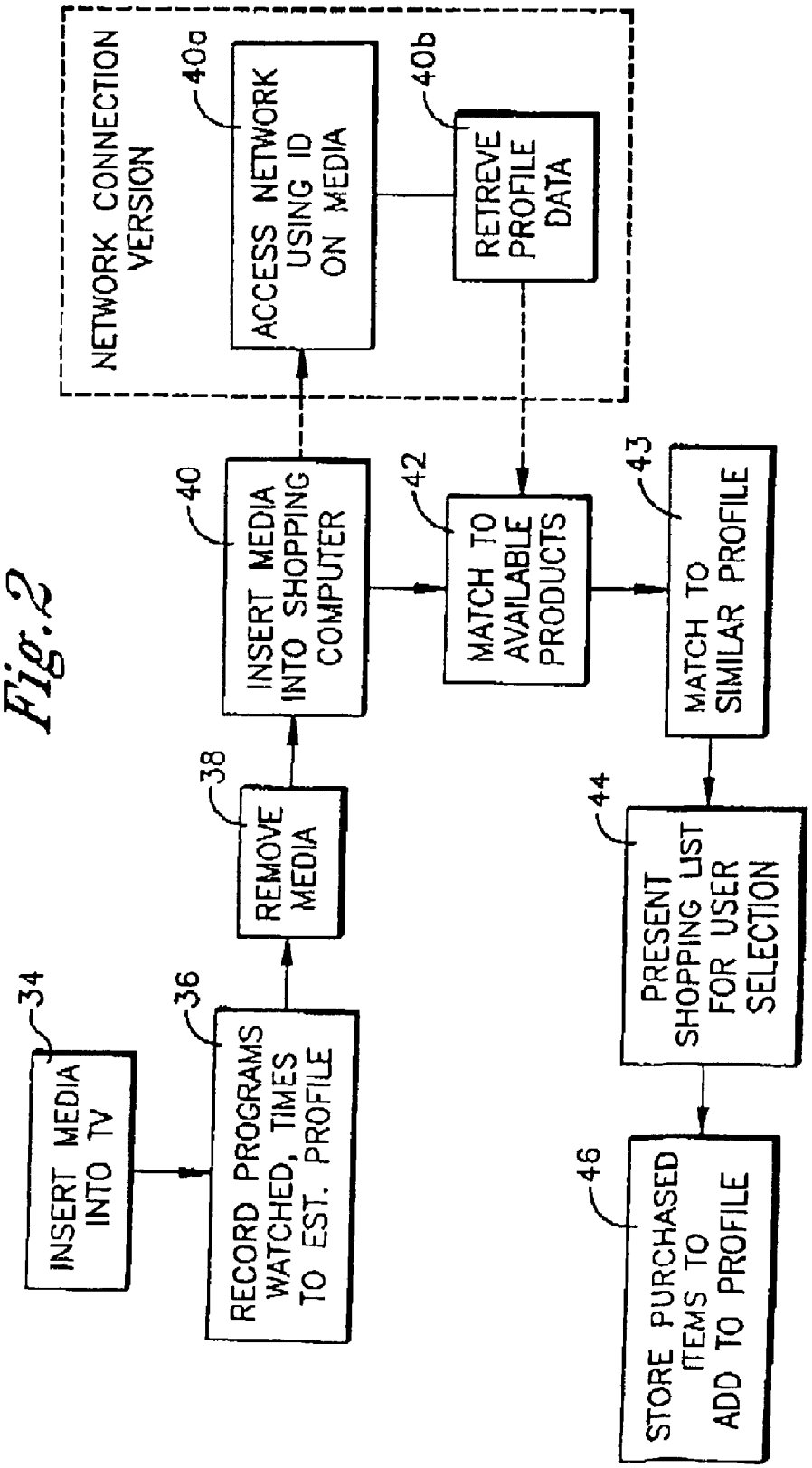
FIG. 2 is a flow chart of the present logic.

Now referring to FIG. 2, at block 34 the removable media device 25 is engaged with the receptacle 24 of the TV 12, to communicate with the processor 26 therein. Proceeding to block 36, the programs, DVDs, CDs, etc. that are watched by the viewer and associated with the device 25, along with length of time watched and other viewing data as desired, are recorded on the device 25. Other data can include artist, title, genre, age ratings, etc. One or more of these types of data form the basis of a viewer profile. In recording channels/programs, the processor 26 can access metadata regarding the genre of particular programs and other program-related information as might be available in, e.g., electronic program guides.

If desired, the processor 26 can further process the data discussed above to render a more processed profile in accordance with predetermined heuristics. In one embodiment, as the viewer manipulates, e.g., the remote control device 20, the viewer's inputs are recorded and timestamped to establish a click stream, which can in turn establish the profile that can be recorded on the media 25. Non-limiting examples of viewer profiles might be "likes westerns, does not like sports", "likes morning news shows", "dislikes cartoons, likes sports", and so on. As an example of one non-limiting way to establish a viewer profile based on a click stream, the processor might simply note when two or more of the same TV commands were input by the viewer at the same time of day for two or more days. For instance, the viewer might select a TV news channel at low volume for two separate mornings. A simple profile in this case might be "viewer desires morning news at low volume". It might be further noted that every Saturday morning the viewer selects a cartoon channel at high volume, and this can be added to the viewer profile.

It is to be understood, however, that the principles set forth herein apply to any heuristics that can be used to derive a viewer profile or preferences using the click stream from the remote control device 20. For example, relatively more complicated heuristics for deriving viewer profiles can be used if desired.

In a less preferred embodiment, each viewer can program his or her own device 25. The programming can be undertaken by inserting the device into the receptacle 24. The processor 26 could then display a programming prompt on the monitor 16 of the TV 12 to guide a viewer through data entry regarding what types of programs the viewer likes and dislikes, etc. using, e.g., the remote control device 20.

Once a viewer's media 25 has been overtly or unobtrusively programmed with the viewer's unprocessed or processed profile, a viewer can subsequently remove the media at block 38 and insert it into the receptacle 32 of the kiosk 28 at block 40. In a network connection version, the network such as the Internet can be accessed at block 40*a* using an identification on the media and the profile data retrieved from the network at block 40*b*.

Regardless of how the profile is retrieved, at block 42 the processor 30 in the kiosk 28 matches the viewer's preferences to available products, based on the viewer's profile gleaned from the TV interaction. For instance, suppose the kiosk 28 is a video rental kiosk. If an unprocessed profile is stored on the media 25, the processor might detect that the viewer watched animal shows for many hours and sports for only short periods, and would accordingly recommend, at block 44, a list of animal-related movies. Or, in the case of a processed profile having been recorded on the media 25 by the TV processor 26 indicating "likes animal shows", the kiosk processor 30 would more directly arrive at a determination that animal-related videos should be recommended at block 44. As another example, information about a DVD movie that might have been watched can be stored on the removable media, so that matching soundtracks, books, films, etc. can be recommended. Yet again, profile data from multiple viewers can be accessed at block 43 to gain recommendations based on the profiles of friends. This information can be accessed by storing data from the media when it is inserted into a kiosk or via a network, and then allowing a third party to retrieve the data upon entry of a password, so that friends can purchase goods and services for friends, based on the profiles. At block 46, the identifications of the items purchased can be stored and later added to the user's profile or otherwise used to modify the profile.

While the particular SYSTEM AND METHOD FOR ESTABLISHING VIEWER SHOPPING PREFERENCES BASED ON VIEWING AND LISTENING PREFERENCES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A method for enhancing a viewer's shopping experience, comprising the acts of:
   engaging a removable memory device with a receptacle in communication with an entertainment device;
   storing information related to user entertainment preferences on the memory device;
   removing the memory device from the entertainment device; engaging the memory device with a receptacle in communication with a shopping kiosk; and
   presenting a display to a viewer of the kiosk at least partially based on the information stored on the memory device.

2. A method for enhancing shopping, comprising:
   establishing communication between a memory device and an entertainment device;
   recording viewer programming selections related to the entertainment device on the memory device;
   establishing communication between the memory device and at least one shopping computer; and
   based at least in part on the viewer programming selections, presenting product information.

3. The method of claim 2, wherein the memory device is a portable device.

4. The method of claim 3, wherein the acts of establishing communication include inserting the memory device into the entertainment device and shopping computer, respectively.

5. The method of claim 4, wherein the shopping computer is a kiosk.

6. The method of claim 4, further comprising matching products with viewer preferences based on the viewer selections.

7. A system for promoting purchase of a product, comprising:
   at least one TV system receiving at least one channel signal;
   at least one memory device removably engageable with the TV system for recording the channel associated with the channel signal; and
   at least one shopping computer distanced from TV system and engageable with the memory device to receive information therefrom to present product information to a viewer.

8. The system of claim 7, wherein the shopping computer is a kiosk.

9. The system of claim 7, wherein the memory device is a portable device.

10. The system of claim 7, wherein the memory device is insertable into the TV system and shopping computer, respectively.

11. The system of claim 7, wherein the shopping computer matches products with viewer preferences based on the viewer selections of channels.

12. A system for enhancing shopping, comprising:
   means for establishing communication between a memory device and a TV;
   means for recording viewer selections of channels on the memory device;
   means for establishing communication between the memory device and at least one shopping computer; and
   means for, based at least in pan on the viewer selections of channels, presenting product information to a viewer.

13. The System of claim 12, wherein the memory device is a portable device.

14. The system of claim 13, wherein the shopping computer is a kiosk.

15. The system of claim 14, further comprising means for matching products with viewer preferences based on the viewer selections of channels.

* * * * *